F. N. TAUB.
EM SCALE FOR MONOTYPE MACHINES.
APPLICATION FILED JULY 20, 1915.

1,183,139.

Patented May 16, 1916.

Inventor,
Ferdinand N. Taub.
By Frederick V. Winters
Attorney

UNITED STATES PATENT OFFICE.

FERDINAND N. TAUB, OF NEW YORK, N. Y.

EM-SCALE FOR MONOTYPE-MACHINES.

1,183,139.   Specification of Letters Patent.   Patented May 16, 1916.

Application filed July 20, 1915. Serial No. 40,902.

*To all whom it may concern:*

Be it known that I, FERDINAND N. TAUB, a citizen of the United States, residing at New York city, in the county of Bronx and State of New York, have invented certain new and useful Improvements in Em-Scales for Monotype-Machines, of which the following is a full, clear, and exact specification.

This invention relates to em scales for monotype machines, and has for its object to provide a scale which has a plurality of faces any one of which may be brought into view exclusive of the others, whereby several different marking may be retained on as many faces of the scale and considerable time thus saved in changing from one mark-off to another.

With the single face scale now in use, the operator must figure out and mark off on the scale for each job, erasing the markings for the previous job in order to avoid confusion, so that when he receives another job requiring the same mark-off used for a past job, he is obliged to figure out and mark the scale all over again, whereas with my improved multiple faced scale, he can preserve the former mark-off for future use, thereby saving the time and labor of the second figuring and marking. As this experience occurs numerous times each day, it will be seen that the present invention will materially increase the amount of work done by the operator by reason of the time saved in remarkings.

The invention will be hereinafter first described in connection with the accompanying drawings, which constitute a part of this specification, and then more specifically defined in the claims at the end of the description.

Figure 1:
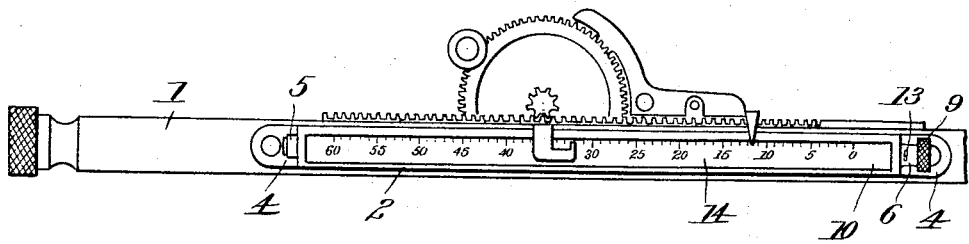
Figure 2:
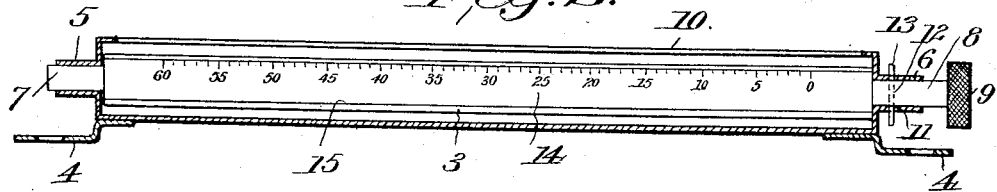
Figure 3:
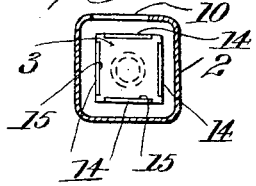
Figure 4:
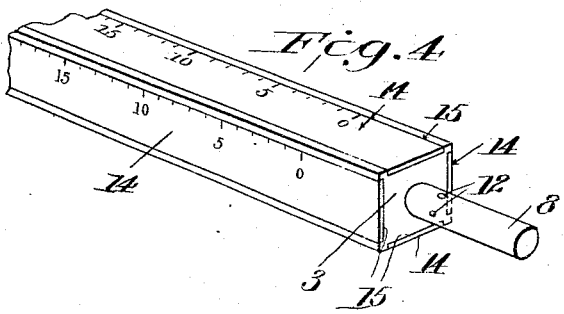

In the accompanying drawings, wherein similar reference characters are used to designate corresponding parts throughout the several views:—Figure 1 is an elevation of the em rack slide of a monotype machine with my improved em scale attached. Fig. 2 is a longitudinal section through the casing for the rotatable scale holder. Fig. 3 is a cross section of the same, and Fig. 4 is a detailed perspective view of one end portion of the scale holder.

The em rack slide 1 is of the usual type used on the monotype machine. To the front of this slide, my improved multiple faced em scale is attached in the same position as the single faced em scale now generally in use. The casing 2, in which the scale holder 3 is rotatably mounted, is generally tubular in shape and is attached to the slide 1 by suitable fastening means passed through brackets 4 at each end.

The casing 2 has bearings 5 and 6 at opposite ends thereof for reduced studs 7 and 8 on the scale holder 3. The stud 8 is fitted with a milled thumb nut 9 for the purpose of rotating said scale holder. The front of the casing is slotted at 10 to permit only one of the faces of the scale holder to be seen at a time, and in order to retain said holder with any one of its faces in position to be viewed through the slot, perforations are provided in the bearing 6 and stud 8, as at 11 and 12, respectively, Figs. 2 and 4, through which a cotter or other pin 13 may be passed.

The scale holder 3 may be provided with any practicable number of lateral faces to hold as many scales. As illustrated in the accompanying drawings, the holder is made with four such lateral faces each of which has a scale 14 secured thereto. As best shown in Fig. 4, the faces of the holder may be recesses, as at 15, and the scales 14 seated in said recesses so as to be flush with the outer surfaces of the holder.

It will be readily seen that the mark-off for one job may be made on the scale which is in view through the slot in the casing, and that when another job is received requiring a different mark-off, another scale may be brought quickly into position for use by simply removing the pin 13 from the perforations 11 and 12, turning the scale holder by means of the nut or knob 9, and replacing the pin. Then when another job is received requiring the same mark-off as the first job, the first scale may easily be turned back in position for use again in the same manner, thus avoiding the necessity of figuring out and remarking for said new job.

Having thus described my invention, what I claim as new and desire to secure by Letters Patent of the United States is:—

1. A multiple faced em scale for monotype machines, in combination with a tubular casing having bearings at its ends, and studs on the ends of scale journaled in said bearings, one of said studs projecting beyond the bearing therefor, and a knob on said projecting stud for rotating the scale.

2. A multiple faced em scale for monotype machines, in combination with a tubular casing having a slot therein and bearings at its ends, studs on the ends of the scale journaled in said bearings, one of the bearings and the stud therein having perforations, and a removable pin to engage said perforations for retaining the scale in position with one face of the scale in register with the slot in the casing.

3. A multiple faced em scale for monotype machines, in combination with a tubular casing having a slot therein and bearings at its ends, studs on the ends of the scale journaled in said bearings, one of the studs projecting beyond its bearing, a knob on said projecting stud for rotating the scale, one of the bearings and stud therein having perforations, and a removable pin to engage said perforations for retaining the scale with one of its faces in register with the slot in the casing.

4. The combination with a tubular slotted casing to be attached to the em rack slide of a monotype machine, of a multiple faced scale holder journaled in said casing, and scales secured to the several faces of the holder and adapted to be separately viewed through the slot in the casing.

5. The combination with a tubular slotted casing to be attached to the em rack slide of a monotype machine, of a multiple faced scale holder journaled in said casing and having recesses in its faces, and a scale secured in the recesses in said faces flush with the outer surfaces of said holder.

In testimony whereof I have signed my name to this specification.

FERDINAND N. TAUB.

Copies of this patent may be obtained for five cents each, by addressing the "Commissioner of Patents, Washington, D. C."